E. C. SOPER.
TREATMENT OF PHOSPHATES.
APPLICATION FILED NOV. 11, 1918.
1,437,456.
Patented Dec. 5, 1922.
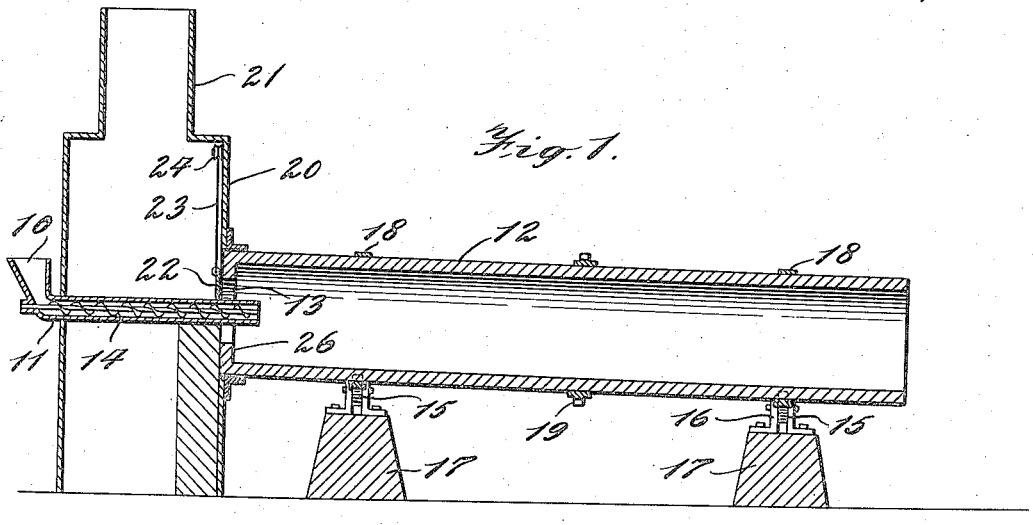
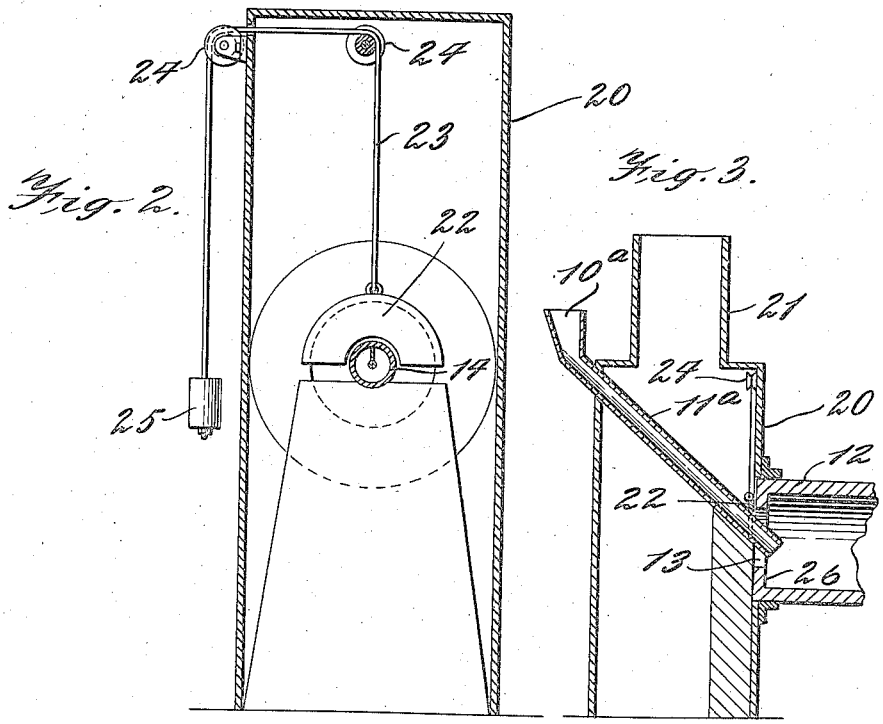
WITNESS:
INVENTOR.
Ellis C. Soper
BY
ATTORNEY.

Patented Dec. 5, 1922.

1,437,456

UNITED STATES PATENT OFFICE.

ELLIS C. SOPER, OF CHATTANOOGA, TENNESSEE.

TREATMENT OF PHOSPHATES.

Application filed November 11, 1918. Serial No. 261,960.

*To all whom it may concern:*

Be it known that I, ELLIS C. SOPER, a citizen of the United States, residing at Chattanooga, in the county of Hamilton and State of Tennessee, have invented certain new and useful Improvements in the Treatment of Phosphates, of which the following is a specification.

My invention relates to new and useful improvements in the treatment of phosphates, and particularly relates to the conversion of insoluble phosphates, for example, calcium phosphate, phosphate of iron, and phosphate of aluminum, or combinations thereof, into citrate soluble form, rendering them suitable for use as fertilizers.

The invention is equally applicable to the treatment of phosphates of calcium, such as are known as Tennessee phosphates and Florida phosphates; phosphates of iron and aluminum which occur principally in the West Indies, and phosphates of aluminum known as apatite. The invention is also applicable to the treatment of so-called "soft phosphates" which are found in large quantities in Florida, and low grade phosphates, which do not contain sufficient phosphoric acid for commercial threatment by processes hitherto known.

The invention consists in the improvements to be more fully described hereinafter, and the novelty of which will be particularly pointed out and distinctly claimed.

In my prior application, Serial No. 243,678, which was filed in the Patent Office July 6, 1918, I have described a process of rendering insoluble phosphatic material citrate soluble, which consists, briefly, in forming an intimate mixture of the material containing the insoluble phosphoric acid with a reagent, such as an alkali metal salt, such intimate mixture being made by finely grinding the mixture of materials with the addition of water to such an amount that the mixture is fluid. The reagent is then thoroughly disseminated throughout the mass of phosphatic material and is brought into intimate contact therewith. This mixture is then treated at the proper temperature, preferably in a rotary kiln. Treatment of the fluid material in a rotary kiln, however, is difficult, because the wet or fluid mixture adheres to the inner lining of the kiln at the inlet portion thereof, resulting in building up, known as "ringing" in rotary kiln practice, of the mixture on the inner surface of the kiln to such an extent that said material will not pass rapidly through the kiln and be properly subjected to the heat thereof. In accordance with my prior invention, in order to overcome this difficulty, a stiffener or drier was added to the mixture, which reduced the initial fluid condition to a substantially plastic state, and briquettes were formed from this material which could be treated in the kiln.

In accordance with my present invention the entire process is carried out with the materials in a dry condition. I have found that the insoluble phosphoric acid of a phosphatic material may be rendered citrate soluble by grinding together the phosphatic material with an alkali reagent such as sodium bi-sulphate, known as nitre-cake, or sodium sulphate, and a carbonaceous material, such as saw-dust or corn-cobs ground into a fine condition, thoroughly mixing the materials, preferably by grinding, after which a limited amount of water which is insufficient in amount to destroy the dry condition of the material may be added, and finally calcining the mixture at a high temperature, preferably at a temperature ranging from 2400° to 2600° F.

While I have found, in practice, that this method, as at present practiced, will not give so high a percentage of citrate soluble phosphoric acid as the method described in my prior application, in which the ingredients are mixed with water, I have found it desirable, under some conditions, to use the present process, because of the saving effected in the cost of fuel. For example, in accordance with the process disclosed in my prior application, as at present practiced, there remains about 1% insoluble phosphoric acid and if a phosphate contains, say, 30% phosphoric acid, the available citrate soluble phosphoric acid will be 29%. Now, when the process is carried out in accordance with my present invention, with the materials in a dry condition—that is, when no appreciable amount of water is added—then the insoluble averages about 3% to 4%, making the percentage of available citrate soluble phosphoric acid 26% or 27%, and this percentage is sufficiently high to make the process entirely commercial under certain conditions.

The phosphatic material may be, for example, phosphate of calcium, such as Florida pebble phosphates, ground either together or separately with a proper reagent; for example, sodium sulphate, sodium bi-sulphate, or sodium carbonate, in varying proportions, depending upon the quality of the phosphate material used as regards its phosphoric acid content. For example, where the phosphatic material is a phosphate of calcium, such as is known as "Florida pebble phosphate," which may contain approximately 31% phosphoric acid in an insoluble form, the rock is pulverized with 20% to 40% of sodium bi-sulphate, or nitre-cake, to a fineness of about 98% or more through a sieve of 100 meshes to the inch. If saltcake (sodium sulphate) is used, a relatively smaller percentage is required—for example, about 15 to 30%. The best results are secured when the silica in the phosphate is less than 8%. If it exceeds this amount, then it is desirable to add calcium carbonate in liberal amount to combine with the silica, as otherwise a tendency to fuse is present. Also, the clinker is much softer and easier to grind when calcium carbonate is added. Good results can be obtained with the addition of this material alone, without the addition of alkali material or carbonaceous material.

In carrying out my process I may proceed as follows:

Any suitable phosphate rock, say, a Tennessee rock, of the following analysis may be used: Phosphoric acid, total 32%; silica 10%; iron and aluminum, 7%. Any appropriate amount of this rock is taken and to the same the following materials may be added: Sodium bi-sulphate (nitre-cake), 22½% by weight of the phosphate; calcium carbonate (95% purity or better), 7½% by weight of the phosphate; saw-dust or ground cobs, 7½% by weight of the phosphate. Roughly, the saw-dust or corn-cobs may be added to the extent of one-third of the total volume of the mix and ground together in the tube-mill. The cobs take up a certain amount of moisture from the mixture in the tube-mill; about one-half their weight. Then more saw-dust or corn-cobs are added until they constitute about one-half of the mix by volume. The materials must be dry and may be finely ground separately and then mixed; but the best results can be obtained only when the grinding is done in a tube-mill in which all of the materials are fed and ground together. The fineness must be such that 96% to 98% or more of the material would pass a 100-mesh sieve, though fair results may be had when the fineness is lower than this.

After the raw material has left the tube-mill, and after it has been mixed with the corn-cobs, the addition of approximately 10% to 20% of water may be made. This addition appreciably reduces the loss in dust, and also assists in effecting the porous condition which is desired for complete action in the kiln. At the same time, the amount of water added is insufficient in amount to destroy what I have described as the dry condition of the material, as the amount of water is insufficient to bring about a plastic condition of the material, which retains its powdered condition.

The ground material is now fed by a mechanical feeder into the upper or feed end of a rotary kiln containing a basic or neutral lining and in the lower end of which is a flame produced as in the ordinary method of firing rotary kilns.

The combustible material in the mixture first burns out quite rapidly at the same time the sulphur gas is driven off from the bi-sulphate, leaving the sodium free to act upon the phosphate. The temperature at which the final conversion of the phosphate to citrate soluble takes place is from 2400° to 2600° F. The resulting sintered material is now ground to a finess of at least 90% through a 100-mesh sieve. The contained phosphoric acid may now be about the following analysis: Total phosphoric acid, 32%; insoluble phosphoric acid, 4%; available phosphoric acid, 28%.

The bi-sulphate has substantially all been decomposed and, of course, the combustible matter has completely burned out. There has been practically no dilution. If one ton of phosphate is treated, then there is produced one ton of product containing the original 32% or 32 units of phosphoric acid.

In the present method of manufacturing, acid phosphates containing more than 5% iron and alumina cannot be used. In this process there is no effect whatever on the product with greater and varying percentages of iron and alumina. The calcium carbonate is added when the silica in the phosphate exceeds 8% and it also assists in producing a softer product; i. e., reduces the cost of final grinding.

The combustible added may be in the form of sawdust, coal with a low ash content, or coke with a low ash, or any other carbonaceous or combustible material. The addition of this material is not absolutely necessary, but it increases the fuel efficiency of the process, and also assists in effecting a better mechanical condition of the material in the feed end of the kiln or furnace by creating a certain porous condition.

The use of corn-cobs as the combustible is advantageous, since they contain a certain amount of potash, which remains as ash in the water soluble form in the finished product and improves the quality of the material as a fertilizer.

In the accompanying drawings I have shown a rotary kiln which is suitable for carrying out the calcining part of the process.

In the drawing, Fig. 1 is a longitudinal section of the kiln; Fig. 2 is a cross-section taken through the box at the front end of the kiln, and Fig. 3 is a view similar to Fig. 1 but showing only a part of the kiln and showing a modified chute for feeding the material to the kiln.

Referring, now, to the drawings, and first to Figs. 1 and 2, 10 is a hopper into which the materials which have been thoroughly mixed in accordance with the process described above, are introduced. The hopper communicates, by means of a tube 11, with the front end of the rotary kiln 12, the tube passing through a central opening 13 at the front end of the kiln. In the form shown in Fig. 1, in which the tube 11 is substantially horizontal, a screw feed 14, or its equivalent, is used for feeding the material from the hopper 10 to the front end of the kiln. The kiln may be mounted on roller bearings 15, which are supported in pedestals 16, carried on supporting blocks 17. Metallic rings 18 are preferably secured peripherally on the outer face of the kiln 12 and engage the rollers 15. The kiln may be rotated by means of a gear-wheel 19, also secured on the outside of the kiln, which is driven by any suitable mechanism (not shown in the drawings). The front end of the kiln 12 communicates through the opening 13 with a smoke or dust-box 20, to which a stack 21 may be secured and which is here shown as integral therewith. A baffle 22, which is here shown generally semi-circular in form, is disposed in front of the upper portion of the opening 13 and immediately above the tube 14. This baffle is connected through a cord or cable 23 passing over pulleys 24 to a counter-weight 25. It will be understood that by adjusting the position of the baffle 22 the draft through the kiln 12 may be regulated. It will be noted that the comparatively small opening which is provided at the front end of the kiln leaves a fairly high retaining ring 26, which prevents an excessive amount of dust from the charge of material being treated in the kiln from passing to the stack and thus being lost.

In Fig. 3 is shown a slight modification of the arrangement for feeding material to the kiln. The tube 11ª is there arranged in an inclined position, so that the material is fed from the hopper 10ª to the kiln by gravity, and without any positive feeding device.

It will, of course, be understood that a suitable burner will be disposed at the mouth of the kiln for introducing a flame into the kiln and heating the charge therein.

What I claim and desire to secure by Letters Patent of the United States is:—

1. The process of treating phosphatic material to render the contained phosphoric acid citrate soluble, which consists in separately grinding carbonaceous material and a mixture of phosphatic material and an alkali-metal reagent, intimately mixing said materials in a dry condition, adding water to the mixture in an amount which leaves the mixture in a powdered condition and calcining the mixture at a temperature of 2400° to 2600° F.

2. The process of treating phosphatic material to render the contained phosphoric acid citrate soluble, which consists in intimately mixing with the material an alkali-metal reagent and carbonaceous material, adding water to the mixture in an amount which leaves the mixture in a powdered condition and calcining in a dry condition and at a temperature sufficient to convert the phosphatic material to citrate soluble material.

3. The process of treating phosphatic material to render the contained phosphoric acid citrate soluble, which consists in intimately mixing with the material an alkali-metal reagent and ground corn-cobs, adding water to the mixture in an amount which leaves the mixture in a powdered condition and calcining the mixture in a dry condition at a temperature sufficient to convert the phosphoric material to citrate soluble material.

4. The process of treating phosphatic material to render the contained phosphoric acid citrate soluble, which consists in intimately mixing with the material an alkali-metal reagent and carbonaceous material, adding 10% to 20% of water, and calcining the material at a temperature sufficient to convert the phosphatic material to citrate soluble material.

5. The process of making a fertilizer which consists in intimately mixing a phosphate rock, an alkali-metal salt and a carbonaceous material containing potash, adding water to the mixture in an amount which leaves the mixture in a powdered condition and calcining the mixture at a high temperature.

6. The process of making a fertilizer which consists in separately grinding phosphate rock, an alkali-metal salt and a carbonaceous material comprising potash in its composition, intimately mixing said material in a dry condition, adding water to the mixture in an amount which leaves the mixture in a powdered condition and then calcining the same at a high temperature.

7. The process of treating phosphatic material to render the contained phosphoric acid citrate soluble, which consists in intimately mixing phosphate rock, sodium bisulphate to the extent of substantially 22½% by weight of the phosphate, and fine carbonaceous material, all in a dry condition, adding water to the mixture in an amount which leaves the mixture in a powdered condition and calcining the mixture at a high temperature.

8. The process of treating phosphatic material to render the contained phosphoric acid citrate soluble, which consists in intimately mixing phosphate rock, sodium bisulphate to the extent of substantially 22½% by weight of the phosphate, and fine carbonaceous material to the extent of substantially 7½% by weight of the phosphate, adding water to the mixture in an amount which leaves the mixture in a powdered condition and calcining the mixture at a high temperature.

9. The process of treating phosphatic material to render the contained phosphoric acid citrate soluble, which consists in intimately mixing with the material a reagent and carbonaceous material in a dry condition, adding water to the mixture in an amount which leaves the mixture in a powdered condition and calcining the mixture at a temperature sufficiently high to render the phosphate citrate soluble.

10. The process of making a fertilizer which consists in intimately mixing a phosphatic material, an alkali-metal salt and a carbonaceous material containing potash, adding water to the mixture in an amount which leaves the mixture in a powdered condition, and then calcining the mixture at a high temperature.

11. The process of making a fertilizer which consists in intimately mixing a phosphatic material, an alkali-metal salt and ground corn-cobs, and then calcining the mixture at a high temperature.

In testimony whereof I have hereunto signed my name in the presence of two subscribing witnesses.

ELLIS C. SOPER.

Witnesses:
 ERNEST APPLEBY,
 DOUGLAS KELLY.